(12) United States Patent
Tsuzaki et al.

(10) Patent No.: US 7,307,782 B2
(45) Date of Patent: Dec. 11, 2007

(54) RAMAN AMPLIFIER AND OPTICAL COMMUNICATION SYSTEM INCLUDING THE SAME

(75) Inventors: Tetsufumi Tsuzaki, Yokohama (JP); Motoki Kakui, Yokohama (JP); Takafumi Terahara, Kawasaki (JP); Junichi Kumasako, Kawasaki (JP)

(73) Assignees: Sumitomo Electric Industries, Ltd., Osaka (JP); Fujitu Limited, Kanagawa (JP)

( * ) Notice: Subject to any disclaimer, the term of this patent is extended or adjusted under 35 U.S.C. 154(b) by 0 days.

(21) Appl. No.: 10/208,198

(22) Filed: Jul. 31, 2002

(65) Prior Publication Data

US 2003/0063371 A1 Apr. 3, 2003

(30) Foreign Application Priority Data

Jul. 31, 2001 (JP) ............................. P2001-232282

(51) Int. Cl.
*H01S 3/00* (2006.01)
(52) U.S. Cl. ...................................................... 359/334
(58) Field of Classification Search ................ 359/334
See application file for complete search history.

(56) References Cited

U.S. PATENT DOCUMENTS

| 6,292,288 | B1 * | 9/2001 | Akasaka et al. ............. 359/334 |
| 6,366,728 | B1 * | 4/2002 | Way et al. ................... 385/123 |
| 6,417,961 | B1 * | 7/2002 | Sun et al. ................. 359/337.5 |
| 6,496,631 | B2 * | 12/2002 | Tsukitani et al. ............ 385/123 |
| 6,529,315 | B2 * | 3/2003 | Bartolini et al. ............. 359/334 |
| 6,633,712 | B2 * | 10/2003 | Dennis et al. ............... 385/123 |
| 6,687,049 | B1 * | 2/2004 | Sulhoff et al. ............ 359/341.4 |
| 7,046,885 | B2 | 5/2006 | Sugizaki |
| 7,050,687 | B2 | 5/2006 | Bickham et al. |
| 7,085,464 | B2 | 8/2006 | Miyabe et al. |

FOREIGN PATENT DOCUMENTS

| EP | 1162768 A1 * | 12/2001 |
| JP | 10039155 | 2/1998 |
| JP | 2000-151507 | 5/2000 |
| JP | 2001007768 | 1/2001 |

OTHER PUBLICATIONS

Islam, Mohammed. Raman Amplifiers for Telecommunications. IEEE Journal of Selected Topics in Quantum Electronics, Vo. 8, No. 3, May/Jun. 2002.*
Hsueh et al. Design of Small-Effective-Area Hole-Assisted Fibers for Discrete Raman Amplification. Optical Society of America. 2002.*
Notice of Rejection, Patent Appln. No. 2002-218688, Dec. 5, 2006 w/English translation.

* cited by examiner

*Primary Examiner*—Deandra M Hughes
(74) *Attorney, Agent, or Firm*—McDermott Will & Emery LLP

(57) ABSTRACT

The present invention relates to a Raman amplifier where flexibility in device design considering both of Raman amplification and dispersion compensation is high. In the Raman amplifier, the Raman amplification optical fiber included in the optical amplification section and the dispersion compensating optical fiber included in the dispersion compensation section are arranged while being optically connected to each other. Since the optical amplification section and the dispersion compensation section are provided as independent optical devices, one device can be designed without being restricted to the design conditions of the other device.

54 Claims, 9 Drawing Sheets

Fig.6

| | FIRST EMBODIMENT RAMAN AMPLIFIER 1 | SECOND EMBODIMENT RAMAN AMPLIFIER 2 | FIRST COMPARISON EXAMPLE RAMAN AMPLIFIER 3 | SECOND COMPARISON EXAMPLE RAMAN AMPLIFIER 4 |
|---|---|---|---|---|
| OUTPUT POWER(mW) OF LD161a (WAVELENGTH: 1390 nm) | 169.0 | 169.0 | 338.0 | |
| OUTPUT POWER(mW) OF LD161b (WAVELENGTH: 1405 nm) | 154.4 | 154.4 | 276.7 | |
| OUTPUT POWER(mW) OF LD161c (WAVELENGTH: 1430 nm) | 122.6 | 122.6 | 218.3 | |
| PREVIOUS STAGE TOTAL OUTPUT POWER (mW) | 446.0 | 446.0 | 833.0 | |
| OUTPUT POWER(mW) OF LD162a (WAVELENGTH: 1390 nm) | 418.9 | 264.2 | 365.4 | 754.0 |
| OUTPUT POWER(mW) OF LD162b (WAVELENGTH: 1405 nm) | 269.0 | 174.7 | 246.4 | 403.3 |
| OUTPUT POWER(mW) OF LD162c (WAVELENGTH: 1430 nm) | 126.9 | 87.8 | 128.9 | 128.8 |
| PREVIOUS STAGE TOTAL OUTPUT POWER (mW) | 314.8 | 526.7 | 740.8 | 1286.2 |

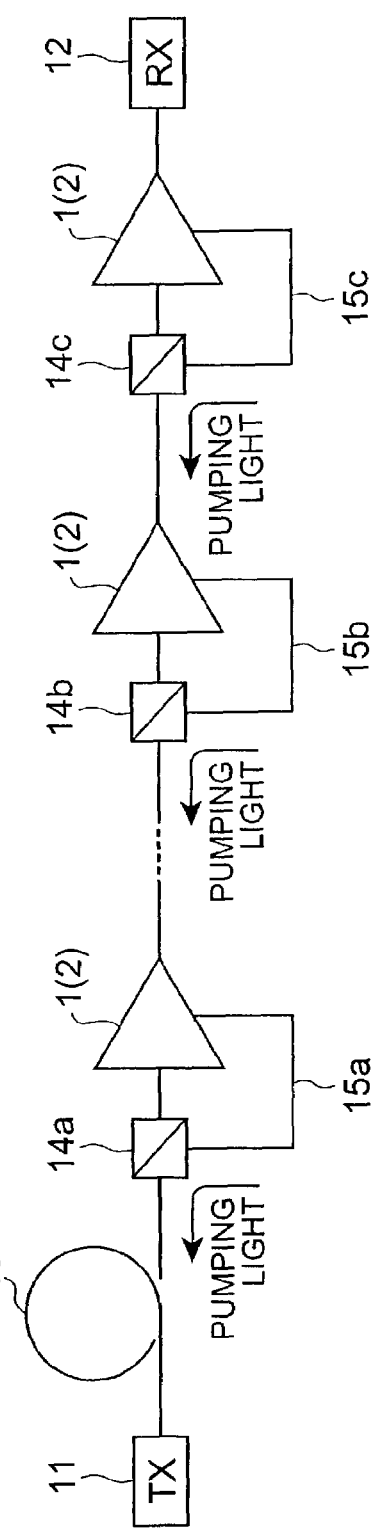
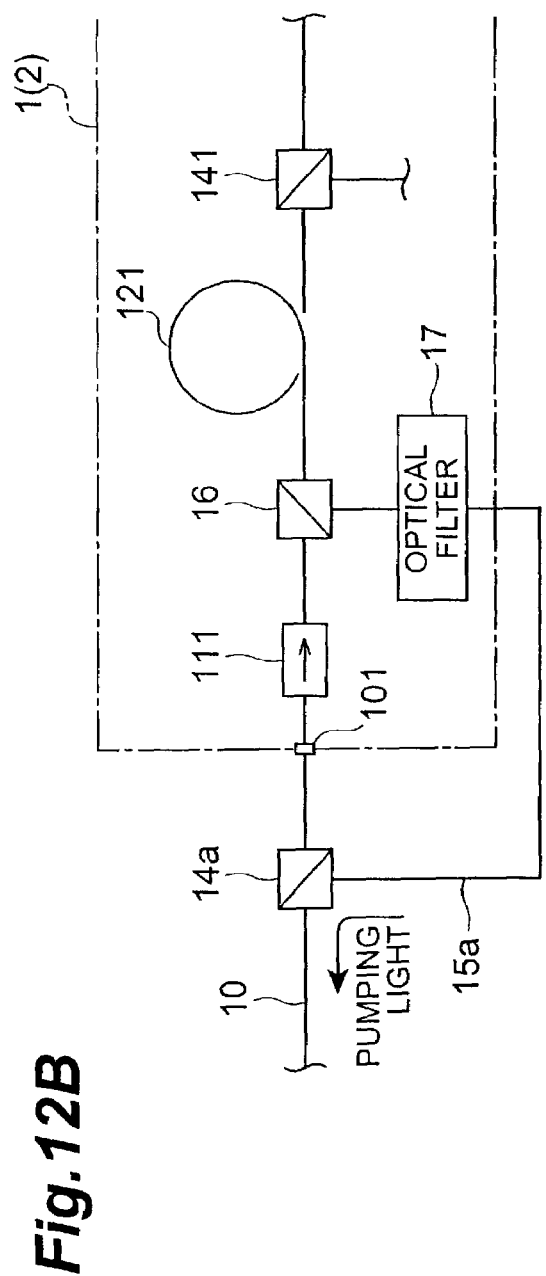
Fig.12A
Fig.12B

RAMAN AMPLIFIER AND OPTICAL COMMUNICATION SYSTEM INCLUDING THE SAME

BACKGROUND OF THE INVENTION

1. Field of the Invention

The present invention relates to a Raman amplifier Raman-amplifying signal light of a plurality of channels having wavelengths different from each other, and an optical communication system including the same.

2. Related Background Art

A rare earth element-doped optical fiber amplifier which uses a rare earth element-doped optical fiber as an optical amplification medium is an optical device having a structure for supplying pumping light having a wavelength to pump the rare earth element into the optical fiber, and amplifying signal light by using the transition between the energy levels of the rare earth element. Therefore, in a rare earth element-doped optical fiber amplifier, the wavelength band range of signal light which can be amplified is limited. Whereas the Raman amplifier is an optical amplifier using the Raman scattering phenomena in an optical fiber where signal light propagates, and if the transmission medium of the signal light is a silica-based optical fiber, then the signal light can be Raman-amplified by supplying pumping light, having a wavelength about 100 nm shorter than the signal light wavelength, to the optical fiber. Therefore, with the Raman amplifier, the wavelength band range of signal light which can be amplified is arbitrary, and the pumping light wavelength can be appropriately set according to the signal light wavelength.

As the Raman amplifier, not only a structure for Raman-amplifying signal light in an optical fiber transmission line laid in the relay section, but also a structure, as a module provided in a repeater, for Raman-amplifying signal light in the repeater is known. The Raman amplifier is an optical device using Raman scattering, which is one type of non-linear optical phenomena in a Raman amplification optical fiber. Since a dispersion compensating optical fiber compensates for a chromatic dispersion of the optical fiber transmission line is, in general, an optical fiber having a small effective area and a high non-linearity, a structure for Raman-amplifying signal light by using this dispersion compensating optical fiber as a Raman amplification optical fiber is also known.

SUMMARY OF THE INVENTION

The present inventors studied conventional Raman amplifiers, and discovered the following problems. In the case of a Raman amplifier where the dispersion compensating optical fiber is applied as a Raman amplification optical fiber, it is necessary that one optical fiber realizes both of the Raman amplification function and the dispersion compensation function, so one function is restricted by the other function. For example, in order to compensate for a chromatic dispersion of the optical fiber transmission line, the length of a dispersion compensating optical fiber is set according to not only the chromatic dispersion and the length of the optical fiber transmission line, but also according to the chromatic dispersion of the dispersion compensating optical fiber itself. But, if the dispersion compensating optical fiber for which the length is set like this is applied to the Raman amplifier as a Raman amplification optical fiber, a sufficient Raman amplification gain may not be obtained. Therefore, in a conventional Raman amplifier, the design flexibility thereof is low for both of the device design considering Raman amplification and the device design considering dispersion compensation.

It is an object of the present invention to provide a Raman amplifier having high design flexibility for both of the device design considering Raman amplification and the device design considering dispersion compensation, and an optical communication system including the same.

The Raman amplifier according to the present invention is an optical device for Raman-amplifying signal light (WDM signal light) of a plurality of channels having wavelengths different from each other, which is provided at a predetermined position on an optical fiber transmission line for capturing signal light propagating the optical fiber transmission line and has an input end, and an output end for outputting Raman-amplified signal light. Particularly, the Raman amplifier according to the present invention comprises a light amplification section and a dispersion compensation section, which are provided between the input end and the output end respectively while being optically connected to each other. The optical amplification section includes a Raman amplification optical fiber for Raman-amplifying the signal light by supplied pumping light. The dispersion compensation section includes a dispersion compensating optical fiber, for example, and compensates for a chromatic dispersion of the optical fiber transmission line and the Raman amplification optical fiber in a signal light wavelength band.

The pumping light may be the pumping light of a plurality of channel shaving wavelengths different from each other, so as to enable Raman amplification with a wider signal light wavelength band.

In the Raman amplifier according to the present invention, it is preferable that the signal light propagation path from the input end to the output end, excluding the dispersion compensation section, has a cumulative chromatic dispersion whose absolute value is 5 ps/nm or less in the signal light wavelength band. In this case, the dispersion compensation section is designed such that the optical fiber transmission line, positioned outside the Raman amplification section, becomes the dispersion compensation target.

The Raman amplifier according to the present invention further comprises a pumping light supply system for supplying pumping light having at least a sufficient power to cause induced Raman scattering to the Raman amplification optical fiber. This pumping light supply system constitutes a part of the light amplification section of the Raman amplifier, and includes a pumping light source (first pumping light source) for supplying pumping light to the Raman amplification optical fiber, and a first optical multiplexing structure for guiding the pumping light from the first pumping light source to the Raman amplification optical fiber without passing through the dispersion compensation section, such as a dispersion compensating optical fiber.

As described above, the Raman amplifier according to the present invention has a dispersion compensation section for implementing the dispersion compensation function and a light amplification section for implementing the Raman amplification function, which are provided as optical devices independent from each other, so high flexibility is obtained for both of the device design considering Raman amplification and the device design considering dispersion compensation. Specifically, when the signal light propagation path from the input end to the output end, excluding the dispersion compensation section in the Raman amplifier, has a cumulative chromatic dispersion whose absolute value is 5 ps/nm or less in the signal light wavelength band, it is substantially unnecessary for the dispersion compensation section to compensate for the chromatic dispersion in the Raman amplification optical fiber in the Raman amplifier, so an even higher design flexibility is obtained.

In the Raman amplifier according to the present invention, Raman amplification can be performed in the dispersion compensation section if the dispersion compensation section has a configuration which includes a dispersion compensating optical fiber. In this case, it is preferable that the pumping light supply system includes a pumping light source (second pumping light source) for supplying pumping light having a sufficient power to cause induced Raman scattering to the dispersion compensating optical fiber, and a second optical multiplexing structure for guiding the pumping light from the pumping light source to the dispersion compensating optical fiber without passing through the Raman amplification optical fiber. These first and second pumping light sources may be a common pumping light source. Raman amplification is also possible in the dispersion compensating optical fiber by installing the dispersion compensating optical fiber at a position where the pumping light which propagated at least a part of the Raman amplification optical fiber reaches.

In particular, Raman amplification in the dispersion compensating optical fiber can make the dispersion compensating optical fiber to be substantially no loss in the signal light wavelength band. In other words, it is preferable that the pumping light to be supplied to the dispersion compensating optical has a sufficient power or more to obtain Raman gain to cancel transmission loss in the dispersion compensating optical fiber. In other words, the signal light is Raman-amplified also in an part excluding the light amplification section (dispersion compensation section), so an effective loss of the dispersion compensation section in the signal light wavelength band decreases, and the loss becomes substantially none. In this case, the effective gain of Raman amplification in the Raman amplifier is roughly the same as the Raman amplification gain in the light amplification section, so the flexibility of the device design considering both Raman amplification and dispersion compensation further increases, and a deterioration of noise figure is effectively controlled.

In the Raman amplifier according to the present invention, the Raman amplification optical fiber may include a forward stage Raman amplification optical fiber provided at the upstream side and a backward stage Raman amplification optical fiber provided at the downstream side, in view from the signal light propagation direction. In this case, the Raman amplifier Raman-amplifies the signal light in both of the forward stage Raman amplification optical fiber and the backward stage Raman amplification optical fiber, so the signal light can be Raman-amplified at low noise and high gain. In particular, it is preferable that the dispersion compensation section is arranged between the forward stage Raman amplification optical fiber and the backward stage Raman amplification optical fiber to effectively control the deterioration of noise figure characteristic.

In the Raman amplifier according to the present invention, the Raman amplification optical fiber may have a chromatic dispersion whose absolute value is 5 ps/nm/km or more in the signal light wavelength band, or may have a zero dispersion wavelength of shorter than the shortest wavelength of the pumping light to be supplied. In this case, the generation of four wave mixing (including remote four wave mixing) is effectively controlled, and an excellent Raman amplification characteristic is obtained. Particularly, when such Raman amplification optical fiber comprises the forward stage and backward stage optical fibers, the signal light propagation path from the input end to the output end in the Raman amplifier, excluding the dispersion compensation section, can have a cumulative chromatic dispersion whose absolute value of which is 5 ps/nm or less in the signal light wavelength band, if the polarity of the chromatic dispersion of the forward stage optical fiber and the polarity of the chromatic dispersion of the backward stage optical fiber are set to be opposite.

Also in the Raman amplifier according to the present invention, it is preferable that the Raman amplification optical fiber has an effective area of 30 $\mu m^2$ or less at a pumping light wavelength. This is because the Raman gain coefficient increases and high efficiency Raman amplification becomes possible. In the Raman amplifier according to the present invention, it is preferable that the Raman amplification optical fiber has a cut-off wavelength of shorter than the shortest wavelength of the pumping light to be supplied. This is because the pumping light to be supplied to the Raman amplification optical fiber propagates in a single mode, so stable gain can be obtained. Also in the Raman amplifier according to the present invention, it is preferable that the signal light propagation path from the input end to the output end is 1 ps or less in the signal light wavelength band. In this case, deterioration of the transmission characteristic is controlled for the Raman amplifier.

The pumping light supply system in the Raman amplifier according to the present invention may include a pumping light source for outputting pumping light and a drive circuit for driving the pumping light source. The pumping light source and drive circuit may be provided separately from the optical amplification section, so that installation is possible after Raman amplification optical fibers are installed.

The optical communication system according to the present invention comprises an optical fiber transmission line where signal light of a plurality of channels propagate, and a Raman amplifier having the above mentioned structure. Particularly to enable a long haul transmission, the optical communication system according to the present invention may comprises a plurality of Raman amplifiers each having a structure similar to the Raman amplifier.

In the optical communication system according to the present invention, various modifications to improve the SN ratio is possible to further improve system performance. In other words, the optical communication system according to the present invention may have a configuration to further improve the noise characteristic by causing induced Raman scattering in the optical fiber transmission line at the input end side of the Raman amplifier. Specifically, the optical communication system may comprise a pumping light source (third pumping light source) for supplying new pumping light to the optical fiber transmission line at the input end side, and a third optical multiplexing structure for guiding the pumping light from the pumping light source to the optical fiber transmission line. In the case of a configuration where a plurality of Raman amplifiers are provided on an optical fiber transmission line, it is efficient to supply the pumping light to the optical fiber transmission line at the input end side of the Raman amplifier which locates at the most upstream side among the plurality of Raman amplifiers. Also this optical communication system may comprise a bypass transmission line for supplying pumping light, which propagates through at least a part of the Raman amplification optical fiber of the Raman amplifier, to the optical fiber transmission line at the input end side of the Raman amplifier, and a fourth optical multiplexing structure for guiding the pumping light, which propagates through the bypass transmission line, to the optical fiber transmission line. In this case, it is preferable that the Raman amplifier includes an optical demultiplexer for guiding the light propagated through the Raman amplification optical fiber to the bypass transmission line, and an optical filter for transmitting the pumping light out of the demultiplexed lights by the optical demultiplexer.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a table showing the output power of each semiconductor laser light source (pumping light source) of the Raman amplifiers of the first embodiment, second embodiment, first comparison example, and second comparison example respectively;

FIG. 12A and FIG. 12B are diagrams depicting the configuration of the second embodiment of the optical communication system according to the present invention.

DESCRIPTION OF THE PREFERRED EMBODIMENTS

Embodiments of the Raman amplifier and the optical communication system according to the present invention will now be described with reference to the FIGS. 1-4, 5A-5B, 6-11, and 12A and 12B. In these drawings, the same elements are denoted with the same symbols, where redundant descriptions are omitted.

First Embodiments Raman Amplifier

Figure 1:
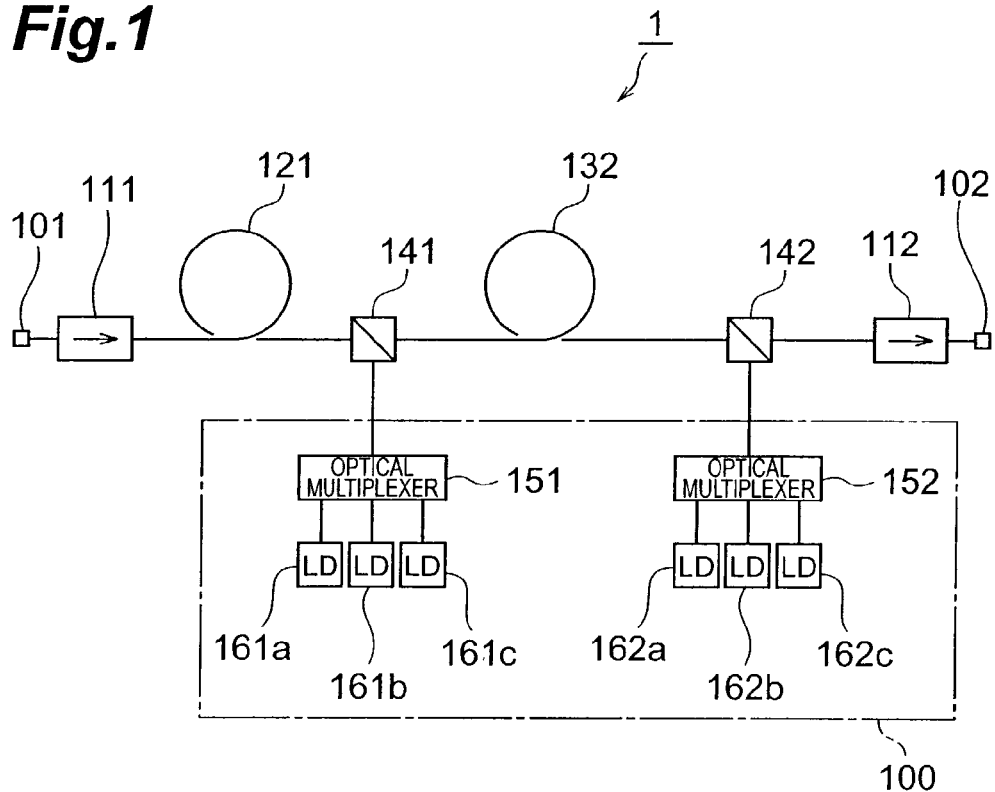
FIG. 1 is a diagram depicting the configuration of the first embodiment of the Raman amplifier according to the present invention.

FIG. 1 is a diagram depicting the configuration of the first embodiment of the Raman amplifier according to the present invention. The Raman amplifier 1 according to the first embodiment comprises an optical isolator 111, a Raman amplification optical fiber 121, an optical coupler 141 (included in the first optical multiplexing structure), a dispersion compensating optical fiber 132, an optical coupler 142 (included in the second optical multiplexing structure), and an optical isolator 112, which are sequentially provided from the input end 101 to the output end 102. The semiconductor laser light sources 161a to 161c (first pumping light source) are connected to the optical coupler 141 through the optical multiplexer 151. The semiconductor laser light sources 162a to 162c (second pumping light source) are connected to the optical coupler 142 through the optical multiplexer 152. The optical couplers 141 and 142 (first and second optical multiplexing structures), the optical multiplexers 151 and 152, and the semiconductors laser light sources 161a to 161c and 162a to 162c (first and second pumping light sources) constitute the pumping light supply system 100.

In the Raman amplifier 1 according to the first embodiment, the optical amplification section includes the Raman amplification optical fiber 121, the optical coupler 141, the optical multiplexer 151, and the semi conduct or laser light sources 161a to 161c. The dispersion compensation section includes the dispersion compensating an optical fiber 132, and pumping light is supplied from the semiconductor laser light sources 162a to 162c is supplied to the dispersion compensating optical fiber 132 through the optical multiplexer 152 and the optical coupler 142.

The optical isolator 111 transmits the light reaching from the input end 101 to the Raman amplification optical fiber 121, and blocks the light which propagates in a direction opposite from this transmission light. The optical isolator 112 transmits the light reaching from the optical coupler 142 to the output end 102, and blocks the light which propagates in a direction opposite from this transmission light. The Raman amplification optical fiber 121 Raman-amplifies the signal light guided from the optical isolator 111 by pumping light supplied from the optical coupler 141.

The dispersion compensating optical fiber 132 compensates for the chromatic dispersion in the signal light wavelength in the optical fiber transmission line where this Raman amplifier 1 is provided, and in the Raman amplification optical fiber 121. When the absolute value of the cumulative chromatic dispersion in the signal light propagation path from the input end 101 to the output end 102, excluding the dispersion compensating optical fiber 132, is 5 ps/nm or less in the signal light wavelength band, the compensation target of the dispersion compensating optical fiber 132 becomes the chromatic dispersion in the signal light wavelength of the optical fiber transmission line where the Raman amplifier 1 is provided.

The semiconductor laser light sources 161a to 161c output laserbeams with different wavelengths respectively. The optical multiplexer 151 multiplexes the laser beams which were output from the semiconductor laser light sources 161a to 161c respectively, and outputs the multiplexed light to the optical coupler 141 as the pumping light of a plurality of channels. The optical coupler 141 directly guides the pumping light reaching from the optical multiplexer 151 to the Raman amplification optical fiber 121, and also guides the signal light of the plurality of channels reaching from the Raman amplification optical fiber 121 to the dispersion compensating optical fiber 132.

The semiconductor laser light sources 162a to 162c output laser beams with different wavelengths respectively. The optical multiplexer 152 multiplexes the laser beams which were output from the semiconductor laser light sources 162a to 162c respectively, and outputs the multiplexed light to the optical coupler 142 as the pumping light of the multiple channels. The optical coupler 142 directly guides the pumping light reaching from the optical multiplexer 152 to the dispersion compensating optical fiber 132, and outputs the signal light reaching from the dispersion compensating optical fiber 132 to the optical isolator 112.

For example, signal light to be Raman-amplified is a WDM signal in the S band (wavelength band range of 1460 nm to 1530 nm), the output wavelength (pumping channel wavelength) of the semiconductor laser light sources 161a and 162a respectively is 1390 nm, the output wavelength (pumping channel wavelength) of the semiconductor laser light sources 161b and 162b is 1405 nm respectively, and the output wavelength (pumping channel wavelength) of the semiconductor laser light sources 161c and 162c respectively is 1430 nm.

The optical transmission line is, for example, a single mode optical fiber which has a zero dispersion wavelength near the wavelength of 1.3 μm, and has a positive chromatic dispersion in the signal light wavelength band. For the Raman amplification optical fiber 121, an optical fiber having a small effective area and high non-linearity is suitable, and specifically, high Raman amplification efficiency can be obtained if the effective area thereof is 30 μm² or less at the pumping light wavelength.

The Raman amplification optical fiber 121 may have a chromatic dispersion whose absolute value is 5 ps/nm/km or more in the signal light wavelength band, and have a zero dispersion wavelength of shorter than the shortest wavelength of the pumping light. In this case, the generation of four wave mixing (including remote four wave mixing) is effectively controlled, and an excellent Raman amplification characteristic can be obtained. It is preferable that the Raman amplification optical fiber 121 has a cut-off wavelength of shorter than the shortest wavelength of the pumping light, and in this case, stable gain can be obtained since the pumping light propagates in the Raman amplification optical fiber 121 in single mode.

It is preferable that the signal light propagation path from the input end 101 to the output end 102 has a 1 ps or less polarization mode dispersion in the signal light wavelength band. In this case, deterioration of the Raman amplification characteristic can be effectively controlled.

The Raman amplifier 1 according to the first embodiment operates as follows. The laser beams which were output from the semiconductor laser light sources 161a to 161c respectively are multiplexed by the optical multiplexer 151, and the pumping light of the plurality of channels, which is the multiplexed laser beam, is supplied to the Raman amplification optical fiber 121 through the optical coupler 141. The laser beams which were output from the semiconductor laser light sources 162a to 162c respectively are multiplexed by the optical multiplexer 152, and the pumping light of the plurality of channels, which is the multiplexed laser beam, is supplied to the dispersion compensating optical fiber 132 through the optical coupler 142. The signal light of the plurality of channels entered from the input end 101 reach the Raman amplification optical fiber 121 through the optical isolator 111, and is Raman-amplified in the Raman amplification optical fiber 121. The signal light which was Raman-amplified in the Raman amplification optical fiber 121 passes through the optical coupler 141 and reaches the dispersion compensating optical fiber 132, and is further Raman-amplified in the dispersion compensating optical fiber 132. The signal light which was Raman-amplified in the dispersion compensating optical fiber 132 then passes through the optical coupler 142 and the optical isolator 112 sequentially, and is output from the output end 102 to the optical fiber transmission line outside. The dispersion compensating optical fiber 132 not only Raman-amplifies the signal light, but also functions so as to compensate for the chromatic dispersion in the signal light wavelength of the optical fiber transmission line and Raman amplification optical fiber 121.

Therefore the Raman amplifier 1 according to the first embodiment provides high flexibility to the device design considering both Raman amplification and dispersion compensation. In other words, the loss of signal light which propagates through the optical fiber transmission line is compensated by the Raman amplification in the Raman amplification optical fiber 121 of this Raman amplifier 1. The chromatic dispersion in the signal light wavelength of the optical fiber transmission line and the Raman amplification optical fiber 121, on the other hand, is compensated by the dispersion compensating optical fiber 132 in the Raman amplifier 1. Since the dispersion compensating optical fiber 132 which implements the dispersion compensation function, and the Raman amplification optical fiber 121 which implements the Raman amplification function, are optically connected in this way, the Raman amplifier 1 can provide high design flexibility for both Raman amplification and dispersion compensation.

In the Raman amplifier 1 according to the first embodiment, signal light is Raman-amplified not only in the Raman amplification optical fiber 121, but also in the dispersion compensating optical fiber 132, so the dispersion compensating optical fiber 132 has less effective loss in the signal light wavelength, and becomes a transmission medium with substantially loss-less. In this case, the effective gain of Raman amplification of the signal light in the Raman amplifier 1 is roughly the same as the Raman amplification gain of the signal light in the Raman amplification optical fiber 121, so the design flexibility for both Raman amplification and dispersion compensation further increases, and deterioration of the noise figure can also be effectively controlled.

Second Embodiment of Raman Amplifier

Figure 2:
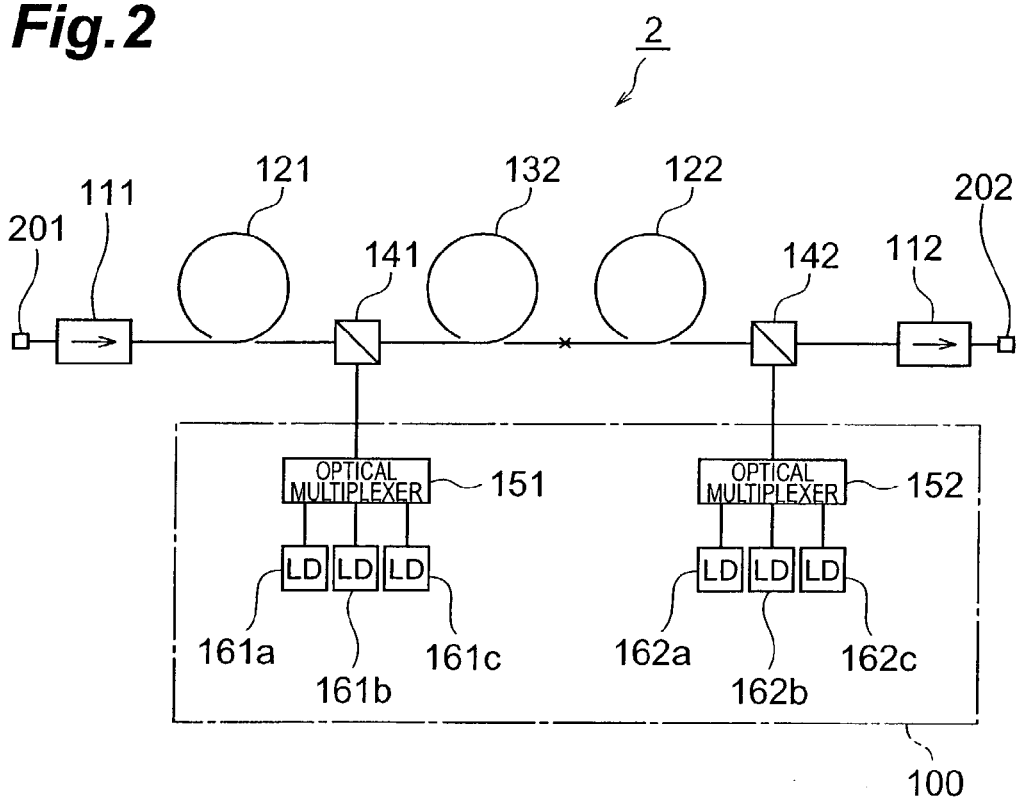
FIG. 2 is a diagram depicting the configuration of the second embodiment of the Raman amplifier according to the present invention.

FIG. 2 is a diagram depicting the configuration of the second embodiment of the Raman amplifier according to the present invention. The Raman amplifier 2 according to the second embodiment is different from the Raman amplifier 1 according to the first embodiment in that a new Raman amplification optical fiber 122 is provided between the dispersion compensating optical fiber 132 and the optical coupler 142. The dispersion compensating optical fiber 132 is arranged between the forward stage Raman amplification optical fiber 121 and the backward stage Raman amplification optical fiber 122.

In the Raman amplifier 2 according to the second embodiment, the optical amplification section comprises the forward stage Raman amplification optical fiber 121, the optical coupler 141 (first optical multiplexing structure), an optical multiplexer 151, the semiconductor laser light sources 161*a* to 161*c* (first pumping light source), the backward stage Raman amplification optical fiber 122, the optical coupler 142 (second optical multiplexing structure), the optical multiplexer 152, and the semiconductor laser light sources 162*a* to 162*c* (second pumping light source). The optical couplers 141 and 142 (first and second optical multiplexing structures), the optical multiplexers 151 and 152, and the semiconductor laser light sources 161*a* to 161*c* and 162*a* to 162*c* (first and second pumping light sources) constitute the pumping light supply system 100. The dispersion compensation section includes the dispersion compensating optical fiber 132, and pumping light, which was supplied from the semiconductor laser light sources 162*a* to 162*c* to the backward stage Raman amplification optical fiber 122 through the optical multiplexer 152 and optical coupler 142, and which propagated through the backward stage Raman amplification optical fiber 122, is supplied to this dispersion compensating optical fiber 132.

Pumping light, which was output from the semiconductor laser light sources 161*a* to 161*c* (multiplexed light multiplexed by the optical multiplexer 151), is supplied to the forward stage Raman amplification optical fiber 121 through the optical fiber 141. This Raman amplification optical fiber 121 Raman-amplifies the signal light reaching from the optical isolator 111, and the Raman-amplified signal light is output to the optical coupler 141.

Pumping light, which was output from the semiconductor laser light sources 162*a* to 162*c* (multiplexed light multiplexed by the optical multiplexer 152), is supplied to the backward stage Raman amplification optical fiber 122 through the optical coupler 142. This Raman amplification optical fiber 122 Raman-amplifies the signal light reaching from the dispersion compensating optical fiber 132, and the Raman-amplified signal light is output to the optical coupler 142.

It is preferable that the Raman amplification optical fibers 121 and 122 are transmission medium having a small effective area and a high non-linearity respectively, and specifically, the optical fibers for amplification 121 and 122 have an effective area of 30 $\mu m^2$ or less at the pumping light wavelengths respectively, so as to obtain high Raman amplification efficiency. It is also preferable that each one of the Raman amplification optical fibers 121 and 122 has a chromatic dispersion whose absolute value is 5 ps/nm/km or more in the signal light wavelength band, and a zero dispersion wavelength of shorter than the shortest wavelength of the pumping light, and in this case, the generation of four wave mixing (including remote four wave mixing) is effectively controlled, and an excellent Raman amplification characteristic is obtained. Also it is preferable that the Raman amplification optical fibers 121 and 122 have a cut-off wavelength of shorter than the shortest wavelength of the pumping light respectively, and in this case, stable gain can be obtained since the pumping light propagates in the Raman amplification optical fibers 121 and 122 in single mode. It is preferable that the signal light propagation path from the input end 201 to the output end 202 has a 1 ps or less polarization mode dispersion in the signal light wavelength band, and in this case, deterioration of the Raman amplification characteristic is effectively controlled.

Particularly, it is preferable that the signal light propagation path from the input end 201 to the output end 202, excluding the dispersion compensating optical fiber 132, has a cumulative chromatic dispersion whose absolute value is 5 ps/nm or less in the signal light wavelength band. Therefore it is preferable that the Raman amplification optical fibers 121 and 122 have a chromatic dispersion with different signs in the signal light wavelength band respectively. In this case, the compensation target of the dispersion compensating optical fiber 132 is the optical fiber transmission line where this Raman amplifier 2 is inserted, and the chromatic dispersion in the signal light wavelength of the optical fiber transmission line is compensated for.

The Raman amplifier 2 according to the second embodiment operates as follows. The laser beams which were output from the semiconductor laser sources 161*a* to 161*c* respectively are multiplexed by the optical multiplexer 151, and the pumping light of a plurality of channels, which is the multiplexed laser beam, is supplied to the Raman amplification optical fiber 121 through the optical coupler 141. The laser beams which were output from the semiconductor laser light sources 162*a* to 162*c* respectively are multiplexed by the optical multiplexer 152, and the pumping light of the plurality of channels, which is the multiplexed laser beam, is sequentially supplied to the Raman amplification optical fiber 122 and the dispersion compensating optical fiber 132 through the optical coupler 142.

The signal light of the plurality of channels entering from the input end 201 passes through the optical isolator 111, reaches the Raman amplification optical fiber 121, and is Raman-amplified in the Raman amplification optical fiber 121. The signal light which was Raman-amplified in the Raman amplification optical fiber 121 passes through the optical coupler 141 and reaches the dispersion compensating optical fiber 132 and the Raman amplification optical fiber 122 sequentially, and is Raman-amplified also in both the optical fibers 132 and 122. The signal light which was Raman-amplified in the Raman amplification optical fiber 122 passes through the optical coupler 142 and the optical isolator 112 sequentially, and is output from the output end 202 to the optical fiber transmission line outside. Also the dispersion compensating optical fiber 132 not only Raman-amplifies the signal light, but also functions so as to compensate for the chromatic dispersion in the signal light wavelength of the optical fiber transmission line and the Raman amplification optical fibers 121 and 122.

Therefore the Raman amplifier 2 according to the second embodiment provides high design flexibility for both Raman amplification and dispersion compensation, just like the case of the first embodiment. In other words, the loss of the signal light, which propagates through the optical fiber transmission line, is compensated by the Raman amplification in the Raman amplification optical fibers 121 and 122 of this Raman amplifier 2. The chromatic dispersion in the signal light wavelength of the optical fiber transmission line and the Raman amplification optical fibers 121 and 122, on the other hand, is compensated for by the dispersion compensating optical fiber 132 in the Raman amplifier 2. Since the dispersion compensating optical fiber 132, which implements the dispersion compensation function, and the Raman amplification optical fibers 121 and 122, which implement the Raman amplification functions, are provided while being optically connected to each other, the Raman amplifier 2 can provide high design flexibility for both Raman amplification and dispersion compensation.

In the Raman amplifier 2 according to the second embodiment, the signal light is Raman-amplified not only in the Raman amplification optical fibers 121 and 122, but also in the dispersion compensating optical fiber 132, so the dispersion compensating optical fiber 132 has less effective loss in the signal light wavelength, and becomes a transmission medium with substantially no loss. In this case, the effective gain of Raman amplification of the signal light in the Raman amplifier 2 is roughly the same as the Raman amplification gain of the signal light in the Raman amplification optical fibers 121 and 122, so the design flexibility for both Raman amplification and dispersion compensation further increases, and deterioration of the noise figure can also be effectively controlled.

Also if the signal light propagation path from the input end 201 to the output end 202, excluding the dispersion compensating optical fiber 132, is designed so as to have a cumulative chromatic dispersion whose absolute value is 5 ps/nm or less at the signal light wavelength band in the Raman amplifier 2 according to the second embodiment, then the dispersion compensating optical fiber 132 compensates for the chromatic dispersion of the optical fiber transmission line at the signal light wavelength, with the optical fiber transmission line where this Raman amplifier 2 is provided as a target to be compensated for. Therefore this Raman amplifier 2 has high design flexibility for both Raman amplification and dispersion compensation, and effectively controls the generation of a non-linear optical phenomena, such as self phase modulation. Also in the Raman amplifier 2 according to the second embodiment, the dispersion compensating optical fiber 132 is arranged between the forward stage Raman amplification optical fiber 121 and the backward stage Raman amplification optical fiber 122, so Raman amplification with low noise and high gain becomes possible.

Comparison Example

Two comparison examples of the Raman amplifier according to the present invention will now be described.

Figure 3:
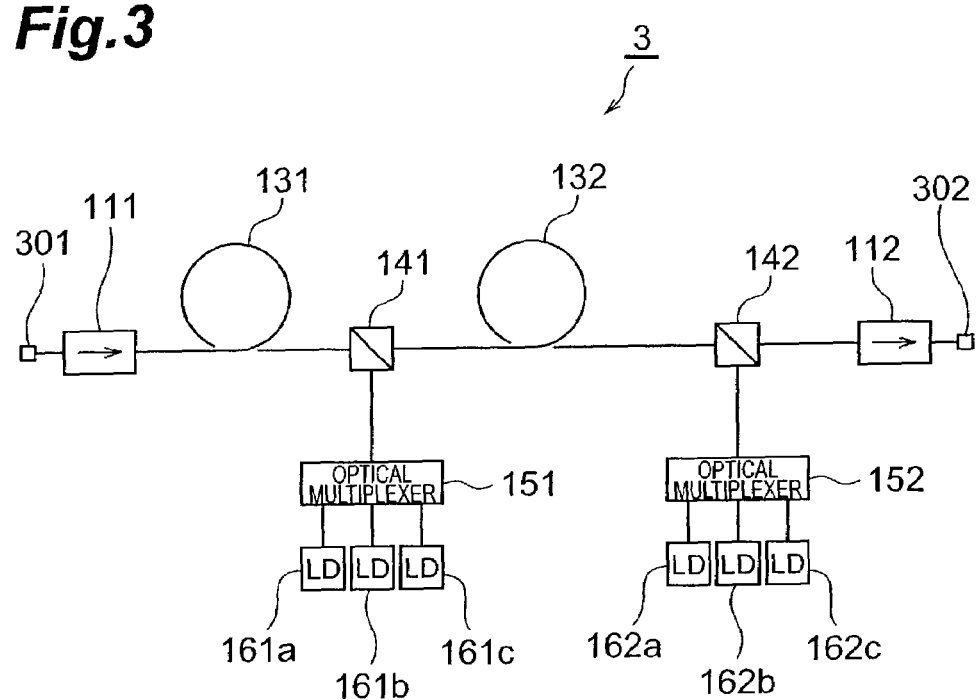
FIG. 3 is a diagram depicting the configuration of the Raman amplifier of the first comparison example.

FIG. 3 is a diagram depicting the configuration of the Raman amplifier 3 according to the first comparison example. The difference between the Raman amplifier 3 according to the first comparison example and the Raman amplifier 1 according to the first embodiment is that the dispersion compensating optical fiber 131 is provided instead of the Raman amplification optical fiber 121. The Raman amplifier 3 according to this first embodiment has only the dispersion compensating optical fibers 131 and 132, which implement the dispersion compensation function, and does not have the Raman amplification optical fiber for implementing the Raman amplification function. In this first comparison example, both of the dispersion compensating optical fibers 131 and 132 function as the Raman amplification optical fibers, and also function as the dispersion compensation section for compensating for the chromatic dispersion of the optical fiber transmission line.

The Raman amplifier 3 according to this first comparison example operates as follows. The signal light of a plurality of channels entering from the input end 301 passes through the optical isolator 111, reaches the dispersion compensating optical fiber 131, and is Raman-amplified in the dispersion compensation optical fiber 131. The signal light, which was Raman-amplified in the dispersion compensating optical fiber 131, passes through the optical coupler 141, reaches the dispersion compensation optical fiber 132, and is also Raman-amplified in this dispersion compensating optical fiber 132. And the signal light, which was Raman-amplified in the dispersion compensating optical fiber 132, passes through the optical coupler 142 and the optical isolator 112 sequentially, and is output from the output end 302 to the optical fiber transmission line outside. The dispersion compensating optical fibers 131 and 132 not only Raman-amplify the signal light, but also function so as to compensate for the chromatic dispersion of the optical fiber transmission line at the signal light wavelength.

Figure 4:
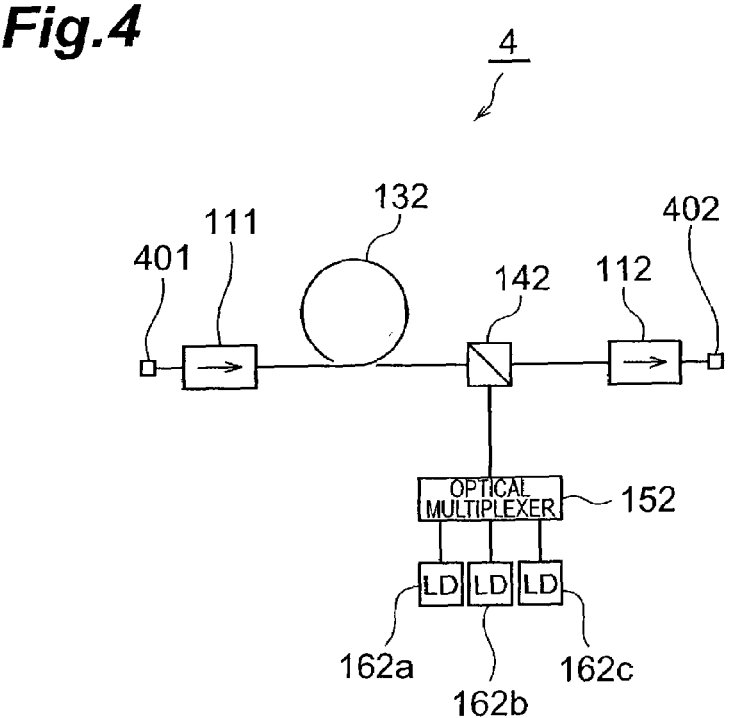
FIG. 4 is a diagram depicting the configuration of the Raman amplifier of the second comparison example.

FIG. 4 is a diagram depicting the configuration of the Raman amplifier 4 according to the second comparison example. The difference between the Raman amplifier 4 according to the second comparison example and the Raman amplifier 1 according to the first embodiment is that the Raman amplification optical fiber 121, the optical the coupler 141, the optical multiplexer 151, and the semiconductor laser light sources 161a to 161c, are not provided. In the Raman amplifier 4 according to the second comparison example, the dispersion compensating optical fiber 132 implements the dispersion compensation function and the Raman amplification function, and the Raman amplification optical fiber is not provided.

The Raman amplifier 4 according to this second comparison example operates as follows. The signal light of a plurality of channels entering from the input end 401 passes through the optical isolator 111, reaches the dispersion compensating optical fiber 132, and is Raman-amplified in this dispersion compensating optical fiber 132. The signal light, which was Raman-amplified in the dispersion compensating optical fiber 132, passes through the optical coupler 142 and the optical isolator 112 sequentially, and is output from the output end 402 to the optical fiber transmission line outside. The dispersion compensating optical fiber 132 not only Raman-amplifies the signal light, but also functions so as to compensate for the chromatic dispersion of the optical fiber transmission line at the signal light wavelength.

Comparison of First and Second Embodiments, and First and Second Comparison Examples Now the Raman amplifier 1 according to the first embodiment (FIG. 1), Raman amplifier 2 according to the second embodiment (FIG. 2), Raman amplifier 3 according to the first comparison example (FIG. 3), and the Raman amplifier 4 according to the second comparison example will be compared with each other.

In the Raman amplifiers 1 and 2, the length of the Raman amplification optical fiber 121 is 3 km, the length of the Raman amplification optical fiber 122 is 3 km, and the length of the dispersion compensating optical fiber 132 is 15 km respectively. In the Raman amplifier 3, the length of the dispersion compensating optical fiber 131 is 3 km, and the length of the dispersion compensating optical fiber 132 is 12 km. And in the Raman amplifier 4, the length of the dispersion compensating optical fiber 132 is 15 km.

In this way, in each one of the Raman amplifiers 1 to 4, the total length of the dispersion compensating optical fiber is set so as to match 15 km.

In each one of the Raman amplifiers 1 to 4, the insertion loss of the optical isolator 111 is 1 dB, the insertion loss of the optical coupler 141 is 0.6 dB, and the insertion loss of both the optical coupler 142 and optical isolator 112 is 1.2 dB. In the Raman amplifier 2, the connection loss of the dispersion compensating optical fiber 132 and Raman amplification optical fiber 122 is 0.3 dB. And in each one of the Raman amplifiers 1 to 4, the output power of each semiconductor laser light source is set such that the average gain in the S band becomes 20 dB.

Figure 5A:
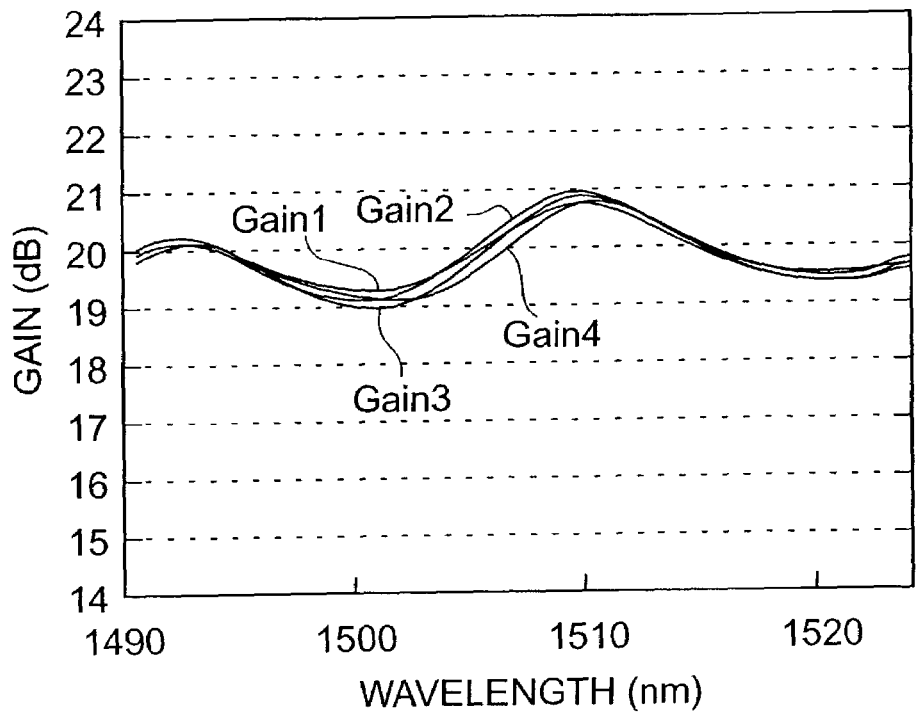
FIG. 5A and FIG. 5B are graphs depicting the gain characteristic and the noise figure characteristic of the first embodiment, second embodiment, first comparison example, and second comparison example respectively.
Figure 5B:
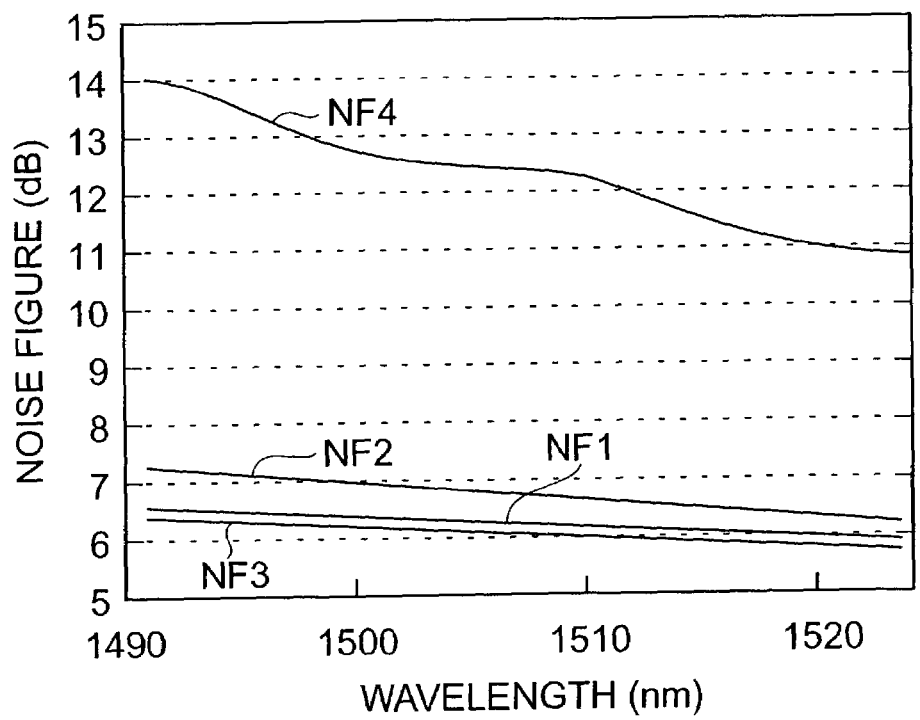

FIGS. 5A and 5B are graphs depicting the gain characteristic and noise figure characteristic of the Raman amplifiers 1 to 4 respectively. In FIG. 5A, the graph Gain 1 indicates the gain characteristic of the Raman amplifier 1, graph Gain 2 indicates the gain characteristic of the Raman amplifier 2, graph Gain 3 indicates the gain characteristic of the Raman amplifier 3, and graph Gain 4 indicates the gain characteristic of the Raman amplifier 4 respectively. In FIG. 5B, graph NF1 indicates the noise figure characteristic of the Raman amplifier 1, graph NF2 indicates the noise figure characteristic of the Raman amplifier 2, graph NF3 indicates the noise figure characteristic of the Raman amplifier 3, and graph NF4 indicates the noise figure characteristic of the Raman amplifier 4 respectively. As FIGS. 5A and 5B show, the noise figures of the Raman amplifiers 1 and 2 according to the first and second embodiments are lower than the noise figures of the Raman amplifiers 3 and 4 according to the first and second comparison examples respectively.

FIG. 6 is a table showing the output power of each semiconductor laser light source of the Raman amplifiers 1 to 4 respectively. As this table shows, the required pumping light power of the Raman amplifiers 1 and 2 according to the first and second embodiments are lower than the required pumping light power of the Raman amplifiers 3 and 4 according to the first and second comparison examples respectively.

Raman Amplifiers According to the First and Second Embodiments

The Raman amplifiers 1 and 2 (particularly the Raman amplification optical fibers 121 and 122) according to the first and second embodiments will now be described.

Generally, compared with a rare earth element-doped optical fiber amplifier, the Raman amplifier has an advantage in that there is no limit in the wavelength band that has gain, but there is a disadvantage in that the pumping efficiency is low. However the Raman gain coefficient ($g_R/A_{eff}$) of the Raman amplification optical fibers 121 and 122 can be increased by decreasing the effective area $A_{eff}$ of the Raman amplification optical fibers 121 and 122.

Figure 7:
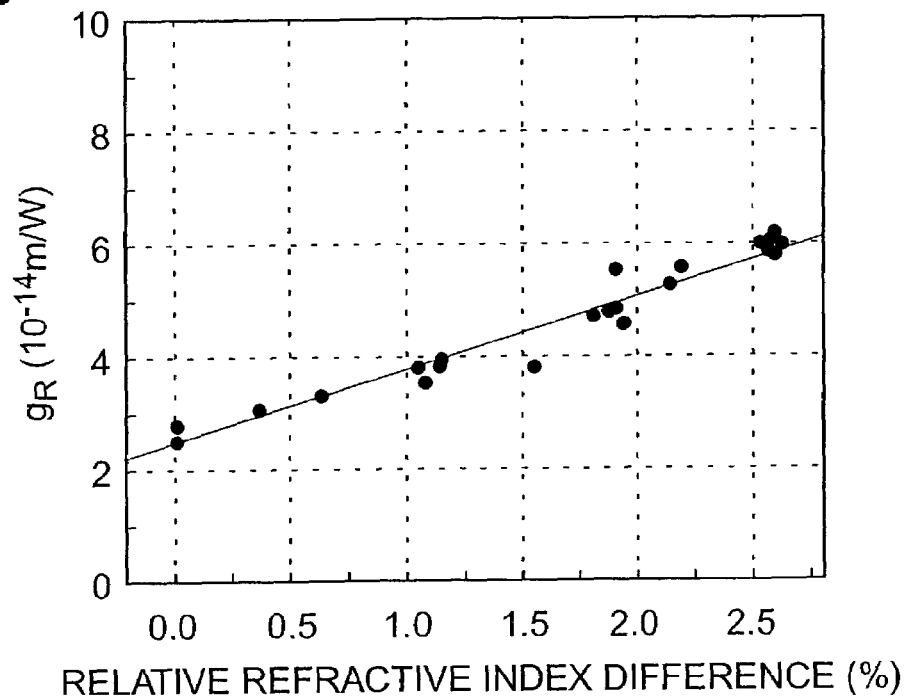
FIG. 7 is a graph depicting the relationship between the relative refractive index difference and $g_R$ in the core region of the optical fiber.

FIG. 7 is a graph depicting the relationship between the relative refractive index difference of the core region and $g_R$. FIG. 7 shows the relationship between the relative refractive index difference of the core region and $g_R$ for various optical fibers, such as a standard single mode optical fiber where $GeO_2$ is added to the core region, a single mode optical fiber where the core region is pure silica glass and an F element is added to the cladding region, a dispersion-shifted optical fiber where the zero dispersion wavelength is shifted to the longer wavelength side at wavelength 1.3 μm, a dispersion compensating optical fiber where the chromatic dispersion is negative at wavelength 1.55 μm, and an optical fiber which effective area is small, and non-linearity is high. As FIG. 7 shows, $g_R$ is substantially in a linear relationship with the relative refractive index difference, and is $2.3 \times 10^{-14}$ m/W or more. Therefore in the following description, it is assumed that $g_R = 2.3 \times 10^{-14}$ m/W.

Figure 8:
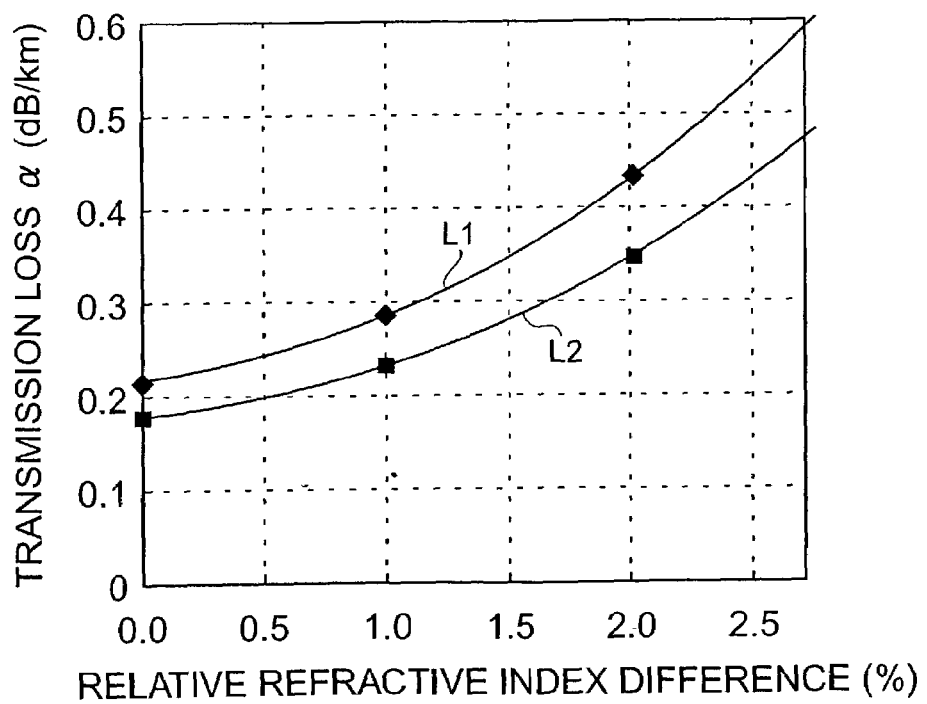
FIG. 8 is a graph depicting the relationship between the relative refractive index difference and transmission loss α in the core region of the optical fiber.

FIG. 8 is a graph depicting the relationship between the relative refractive index difference of the core region and transmission loss α. In FIG. 8, graph L1 shows the relationship between the relative refractive index difference of the core region in a typical optical fiber and transmission loss α at wavelength 1.45 μm, and graph L2 shows the relationship between the relative refractive index difference of the core region in a typical optical fiber and transmission loss α at the wavelength 1.55 μm. According to FIG. 8, the transmission loss α at the pumping light wavelength is assumed to be 0.55 dB/km, and the actual length L of the Raman amplification optical fiber, where the effective length $L_{eff}$ of the Raman amplification optical fiber does not become ½ or less of the actual length, is assumed to be 14.5 km.

The power pump $P_{pump}$ of the pumping light to be supplied to the optical fiber for Ramon amplification is assumed to be 500 mW, which is equivalent to the maximum input pumping light power to the optical fiber for amplification with a general configuration of the Er-doped optical fiber amplifier, which is commercialized as a centralized optical amplifier.

Figure 9:
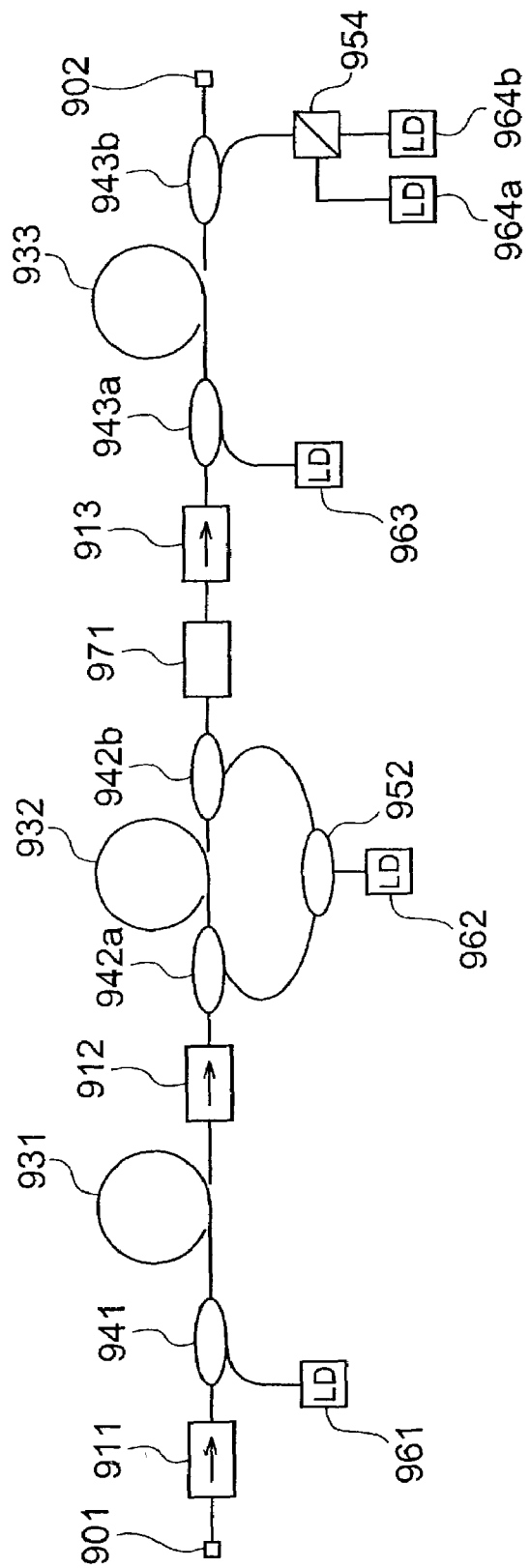
FIG. 9 is a diagram depicting a general configuration of the Er element added optical fiber amplifier.

The Er-doped optical fiber amplifier 9 with a general configuration comprises, for example, an optical isolator 911, optical coupler 941, Er-doped optical fiber 931, optical isolator 912, optical coupler 942a, Er-doped optical fiber 932, optical coupler 942b, dispersion compensator 971, optical isolator 913, optical coupler 943a, Er-doped optical fiber 933, and optical coupler 943b, which are arranged sequentially from input end 901 towards output end 902, as shown in FIG. 9. The pumping light, which is output from the semiconductor laser light source 961, is supplied to the Er-doped optical fiber 931 through the optical coupler 941 in the forward direction with respect to the signal light. The pumping light, which is output from the semiconductor laser light source 962, is branched into two by the optical branching unit 952. One of the branched lights is supplied to the Er-doped optical fiber 932 through the optical coupler 942a in the forward direction with respect to the signal light. The other branched light is supplied to the Er-doped optical fiber 932 through the optical coupler 942b in the back direction with respect to the signal light. The pumping light, which is output from the semiconductor laser light source 963, is supplied to the Er-doped optical fiber 933 through the optical coupler 943a in the forward direction with respect to the signal light. The pumping light, which is output from the semiconductor laser light sources 964a and 964b respectively, is multiplexed by the optical multiplexer 954. And this multiplexed light is supplied to the Er-doped optical fiber 933 through the optical coupler 943b in the backward direction with respect to the signal light.

If attenuation of the pumping light is ignored, then the Raman amplifier gain $G_{Raman}$ (dB) is given by the following formula.

$$G_{Raman} = 10 \cdot \log\left\{\exp\left(\frac{g_R}{A_{eff}} L_{eff} P_{pump}\right)\right\}$$

As a consequence, if the effective area $A_{eff}$ of the Raman amplification optical fiber is 30 μm² or less at the pumping light wavelength, then the absolute value of the Raman amplification gain $G_{Raman}$ becomes a loss of 25 dB or more per span (one relay section) in a typical land optical communication system, which is desirable.

Since the Raman amplification optical fiber is long, the wavelength deterioration of signal light tends to occur in Raman amplification optical fiber due to a non-linear optical phenomena, such as self phase modulation and four wave mixing, if the effective area $A_{eff}$ is small. However, in the case of the Raman amplifier according to the present invention, each of the chromatic dispersion and polarization mode dispersion of the Raman amplification optical fiber is appropriately set, so wave form deterioration of the signal light is effectively controlled.

If the Raman amplifier is applied to the optical communication system as a preamplifier, the loss of the optical demultiplexer, arranged between the Raman amplifier as a pre-amplifier and the light receiving section, is generally about 10dB, and the light receiving dynamic range of the light receiving section per channel is generally −16 dBm/ch to −10 dBm/ch. Therefore the signal light output power per channel of the Raman amplifier requires −6 dBm/ch or more.

Figure 10:
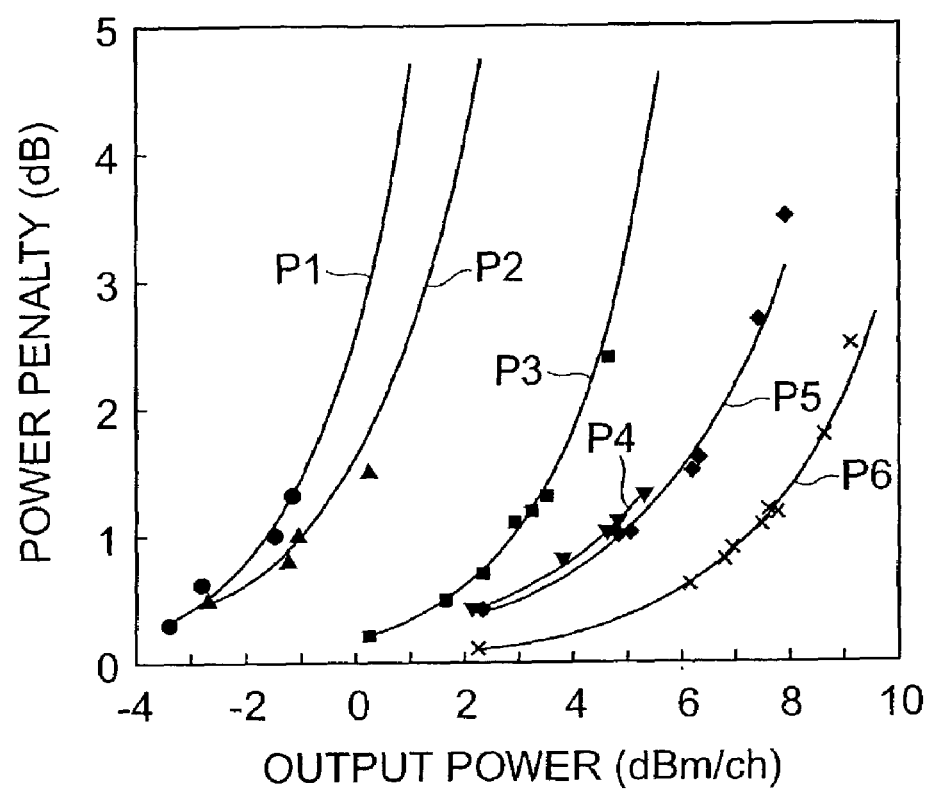
FIG. 10 is a graph depicting the relationship between the signal light output power and the power penalty per channel of the Raman amplifier.

FIG. 10 is a graph depicting the relationship between the signal light output power per channel of the Raman amplifier and power penalty. Here 8channels of multiplexed signal light are input to the Raman amplifier. The Raman amplification optical fiber has high non-linearity. In FIG. 10, graph P1 shows the relationship in the Raman amplification optical fiber with the chromatic dispersion of +2 ps/nm/km, graph P2 shows the relationship in the Raman amplification optical fiber with the chromatic dispersion of −2 ps/nm/km, graph P3 shows the relationship in the Raman amplification optical fiber with the chromatic dispersion of −5 ps/nm/km, graph P4 shows the relationship in the Raman amplification optical fiber with the chromatic dispersion of −7 ps/nm/km, graph P5 shows the relationship in the Raman amplification optical fiber with the chromatic dispersion of −20 ps/nm/km, and graph P6 shows the relationship in the Raman amplification optical fiber with the chromatic dispersion of −40 ps/nm/km. As FIG. 10 shows, if the Raman amplification optical fiber has high non-linearity and has a chromatic dispersion whose absolute value is 5 ps/nm/km or less, then the power penalty caused by the four wave mixing does not become 1 dB or less unless the signal light output power per channel is 2 dBm or less. When the result is applied to the case of 64 channel signal light transmission, the signal light output power per channel is −7 dBm, which is outside the light receiving dynamic range of the light receiving section in the optical communication system where the Raman amplifier is applied to the preamplifier. However, as mentioned above, this problem can be avoided if each one of the Raman amplification optical fibers 121 and 122 has a chromatic dispersion whose absolute value is 5 ps/nm/km or more in the signal light wavelength band.

For example, it is preferable that the Raman amplification optical fiber 121 is mainly made from silica glass, and comprises a $GeO_2$-doped core region having an outer diameter of 4.0 μm, and an F-doped cladding region surrounding the core region, where the relative refractive index difference of the core region is +2.5%, and the relative refractive index difference of the cladding region is −0.7% with respect to the pure silica glass. If the refractive index of the pure silica glass is $n_0$, the refractive index of the core region is $n_1$, the refractive index of the cladding region is $n_2$, then the relative refractive index difference $\Delta_1$ of the core region and the relative refractive index difference $\Delta_2$ of the cladding region with respect to the pure silica glass are given by the following formulas respectively.

$$\Delta_1 = (n_1^2 - n_0^2)/2n_0^2$$

$$\Delta_2 = (n_2^2 - n_0^2)/2n_0^2$$

In this case, the Raman amplification optical fiber 121 has a chromatic dispersion of −9.0 ps/nm/km at a wavelength of 1.55 μm, an effective area of 9.9 μm$^2$, and a Raman gain coefficient of $5.8 \times 10^{-3}$/Wm at the wavelength of 1.55 μm.

Also, if the land main optical communication system with a relay section of 100 km×6 span at bit rate 10 Gb/s is assumed, for example, the polarization mode dispersion which is allowed in this optical communication system is 10 ps or less. Therefore as mentioned above, if the polarization mode dispersion in the signal light propagation path from the input end to the output end of the Raman amplifier is 1 ps or less in the signal light wavelength band, then the transmission quality in this optical communication system is excellent.

(Optical Communication System)

The optical communication system according to the present invention includes an optical fiber transmission line where the signal light of a plurality of channels propagates, and a Raman amplifier having the above mentioned structure. Particularly to enable a long haul transmission, the optical communication system according to the present invention may have a plurality of Raman amplifiers having a structure similar to the Raman amplifier. The optical communication system according to the present invention can be modified in various ways to further improve system performance by improving the optical SN ratio.

Figure 11:
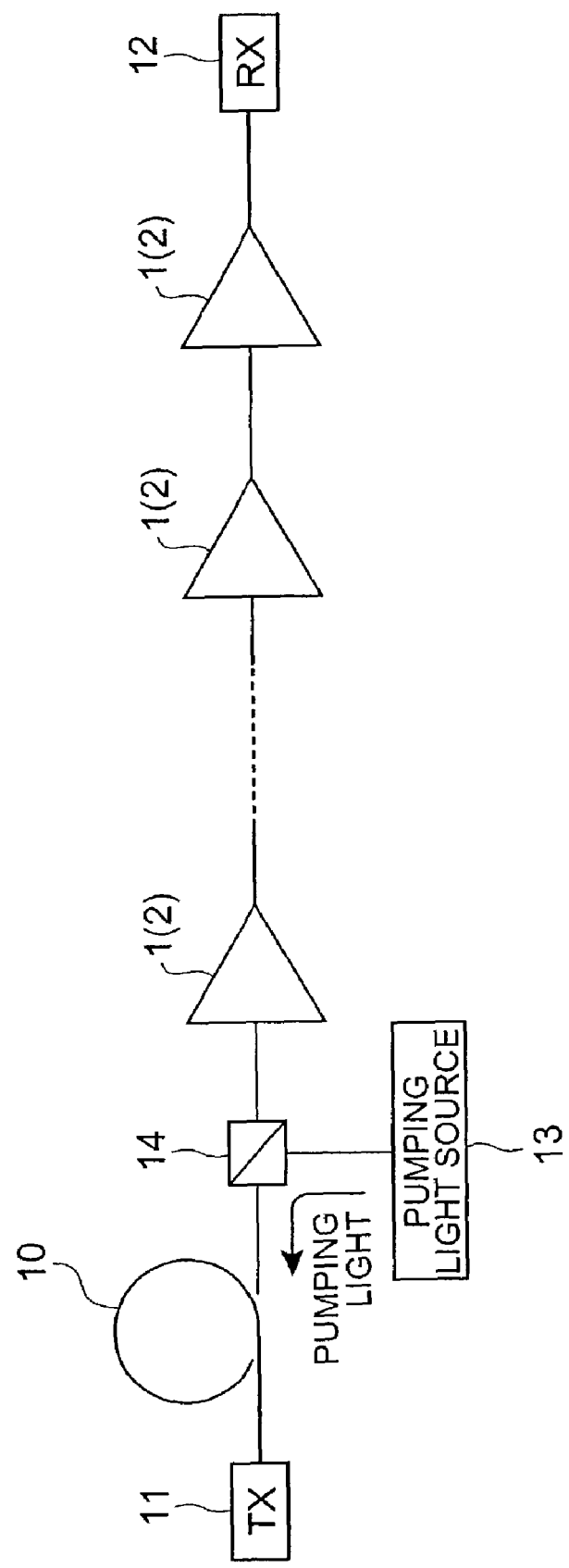
FIG. 11 is a diagram depicting the configuration of the first embodiment of the optical communication system according to the present invention.

As FIG. 11 shows, the optical communication system according to the first embodiment has a configuration to further improve the noise characteristic by causing induced Raman scattering in the optical fiber transmission line 10 at the input end side of the Raman amplifier, which locates at the most upstream side in the Raman amplifiers 1 (2) (Raman amplifier according to the present invention), which is provided at a predetermined position of the optical fiber transmission line 10 laid between the transmitting station 11 and the receiving station 12. FIG. 11 is a diagram depicting the configuration of the first embodiment of the optical communication system according to the present invention.

Specifically, the optical communication system according to the first embodiment comprises a pumping light source 13 (third pumping light source) for supplying new pumping light to the optical fiber transmission line 10 at the input end side, and optical coupler 14 (third optical multiplexing structure) for guiding the pumping light from the pumping light source 13 to the optical fiber transmission line 10. In this way, by Raman-amplifying the signal light in advance, before the signal light is input to the Raman amplifiers 1 (2) arranged on the optical fiber transmission line 10, the noise characteristic is dramatically improved.

FIGS. 12A and 12B are diagrams depicting the configuration of the second embodiment of the optical communication system according to the present invention. In the optical communication system according to the second embodiment as well, a plurality of Raman amplifiers 1 (2) (Raman amplifiers according to the present invention) are arranged on the optical fiber transmission line 10 laid between the transmitting station 11 and the receiving station 12.

In particular, the optical communication system according to the second embodiment comprises bypass transmission lines 15a, 15b and 15c for supplying pumping light which propagated at least a part of the Raman amplification optical fiber 121 of the Raman amplifier, and optical couplers 14a, 14b and 14c for guiding the pumping light which propagated the bypass transmission lines 15a, 15b and 15c to the optical fiber transmission line (fourth optical multiplexing structure) on the optical fiber transmission line at the input end side in each Raman amplifier 1 (2) to improve the noise characteristic of the entire optical communication system.

Also to guide the pumping light from each Raman amplifier 1 (2) to the bypass transmission lines 15a, 15b and 15c, in this optical communication system, an optical demultiplexer 16 for guiding the light which propagated through the Raman amplification optical fiber 121 to the bypass transmission lines 15a, 15b and 15c respectively, and an optical filter 17 for transmitting the pumping light out of the light demultiplexed by the optical demultiplexer 16, are provided in each Raman amplifier 1 (2), as shown in FIG. 12B.

As a consequence, according to the present invention, the dispersion compensation section which implements the dispersion compensation function, and the optical amplification section which implements the Raman amplification function, are provided as independent device composing elements. Therefore high design flexibility is obtained for both the device design considering Raman amplification and the device design considering dispersion compensation, without being restricted by the respective design conditions. In particular, when the signal light propagation path in the Raman amplifier, excluding the dispersion compensation section, has a cumulative chromatic dispersion whose absolute value is 5 ps/nm or less in the signal light wavelength band, then flexibility of device design considering both Raman amplification and dispersion compensation further increases.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion with in the scope of the following claims.

What is claimed is:

1. A Raman amplifier provided at a predetermined position of an optical fiber transmission line and having an input end for entering signal light which propagates through said optical fiber transmission line and an output end for outputting said Raman-amplified signal light, comprising:
    an optical amplification section provided between said input end and said output end, and including a Raman amplification optical fiber for Raman-amplifying signal light which enters through said input end by supplying pumping light into said Raman amplification optical fiber;
    wherein said Raman amplifier further comprises a dispersion compensating section provided between said input end and said output end while being optically connected to said Raman amplification optical fiber, said dispersion compensation section compensating for a total chromatic dispersion of said optical fiber transmission line positioned outside of said Raman amplifier and said Raman amplification optical fiber positioned inside of said Raman amplifier, in a signal light wavelength band,
    wherein said Raman amplification optical fiber has an effective area of 30 $\mu m^2$ or less in the pumping light wavelength, and
    wherein a signal light propagation path from said input end to said output end, excluding said dispersion compensating section, has a total chromatic dispersion whose absolute value is 5 ps/nm or less in the signal light wavelength band.

2. A Raman amplifier according to claim 1, further comprising a pumping light supply system constituting a part of said optical amplification section and including a first pumping light source for supplying said pumping light to said Raman amplification optical fiber.

3. A Raman amplifier according to claim 2, wherein said dispersion compensation section includes a dispersion compensating optical fiber.

4. A Raman amplifier according to claim 3, wherein said pumping light supply system includes a second pumping light source for supplying pumping light with a sufficient power to cause induced Raman scattering to said dispersion compensating optical fiber, and a second optical multiplexing structure for guiding the pumping light from said second pumping light source to said dispersion compensating optical fiber without passing through said Raman amplification optical fiber.

5. A Raman amplifier according to claim 4, wherein the pumping light to be supplied to said dispersion compensating optical fiber has a sufficient power to obtain a Raman gain equal to or more than the transmission loss in said dispersion compensating optical fiber.

6. A Raman amplifier according to claim 3, wherein said dispersion compensating optical fiber is arranged at a position where the pumping light which propagates through at least a part of said Raman amplification optical fiber reaches.

7. A Raman amplifier according to claim 6, wherein said dispersion compensating optical fiber is supplied with pumping light having a sufficient power to obtain a Raman gain equal to or more than transmission loss in said dispersion compensating optical fiber.

8. A Raman amplifier according to claim 1, wherein said Raman amplification optical fiber includes a forward stage Raman amplification optical fiber provided at the upstream side and a backward stage Raman amplification optical fiber provided at the downstream side, in view from the propagation direction of said signal light.

9. A Raman amplifier according to claim 8, wherein said dispersion compensation section is arranged between said forward stage Raman amplification optical fiber and said backward stage Raman amplification optical fiber.

10. A Raman amplifier according to claim 1, wherein said Raman amplification optical fiber has a chromatic dispersion whose absolute value is 5 ps/nm/km or more in the signal light wavelength band.

11. A Raman amplifier according to claim 1, wherein said Raman amplification optical fiber has a zero dispersion wavelength of shorter than the shortest wavelength of the pumping light to be supplied.

12. A Raman amplifier according to claim 1, wherein said Raman amplification optical fiber has a cut-off wavelength of shorter than the shortest wavelength of the pumping light to be supplied.

13. A Raman amplifier according to claim 1, wherein a signal propagation path from said input end to said output end has a polarization mode dispersion of 1 ps or less in the signal light wavelength band.

14. An optical communication system including a Raman amplifier according to claim 1.

15. An optical communication system, comprising:
    an optical fiber transmission line where signal light propagates;
    a Raman amplifier according to claim 1;
    a third pumping light source for supplying the pumping light to said optical fiber transmission line; and
    a third optical multiplexing structure for guiding the pumping light from said third pumping light source to said optical fiber transmission line.

16. An optical communication system, comprising:
    an optical fiber transmission line where signal light propagates;
    a Raman amplifier according to claim 1;
    a bypass transmission line for guiding the pumping light which propagates through at least a part of a Raman amplification optical fiber included in said Raman amplifier to outside said Raman amplifier; and
    a fourth optical multiplexing structure for guiding the pumping light which propagates through said bypass transmission line to said optical fiber transmission line.

17. An optical communication system according to claim 16, further comprising an optical demultiplexer for guiding light which propagates through said Raman amplification optical fiber to said bypass transmission line, and an optical filter for transmitting the pumping light out of the lights demultiplexed by said optical demultiplexer.

18. A Raman amplifier provided at a predetermined position of an optical fiber transmission line and having an input end for entering signal light which propagates through said optical fiber transmission line and an output end for outputting said Raman-amplified signal light, comprising:
an optical amplification section provided between said input end and said output end, and including a Raman amplification optical fiber for Raman-amplifying signal light which enters through said input end by supplying pumping light into said Raman amplification optical fiber;
wherein said Raman amplifier further comprises a dispersion compensating section provided between said input end and said output end while being optically connected to said Raman amplification optical fiber, said dispersion compensation section compensating for a chromatic dispersion of said optical fiber transmission line positioned outside of said Raman amplifier in a signal light wavelength band, and
wherein a signal propagation path from said input end to said output end, excluding said dispersion compensation section, has a total chromatic dispersion whose absolute value is 5 ps/nm or less in the signal light wavelength band.

19. A Raman amplifier according to claim 18, further comprising a pumping light supply system constituting a part of said optical amplification section, and including a first pumping light source for supplying said pumping light to said Raman amplification optical fiber.

20. A Raman amplifier according to claim 19, wherein said dispersion compensation section includes a dispersion compensating optical fiber.

21. A Raman amplifier according to claim 20, wherein said pumping light supply system includes a second pumping light source for supplying pumping light with a sufficient power to cause induced Raman scattering to said dispersion compensating optical fiber, and a second optical multiplexing structure for guiding the pumping light from said second pumping light source to said dispersion compensating optical fiber without passing through said Raman amplification optical fiber.

22. A Raman amplifier according to claim 20, wherein the pumping light to be supplied to said dispersion compensating optical fiber has a sufficient power to obtain a Raman gain equal to or more than the transmission loss in said dispersion compensating optical fiber.

23. A Raman amplifier according to claim 20, wherein said dispersion compensating optical fiber is arranged at a position where the pumping light which propagates through at least a part of said Raman amplification optical fiber reaches.

24. A Raman amplifier according to claim 23, wherein the pumping light to be supplied to said dispersion compensating optical fiber has a sufficient power to obtain a Raman gain equal to or more than a transmission loss in said dispersion compensating optical fiber.

25. A Raman amplifier according to claim 18, wherein said Raman amplification optical fiber includes a forward stage Raman amplification optical fiber provided at the upstream side and a backward stage Raman amplification optical fiber provided at the downstream side, in view from the propagation direction of said signal light.

26. A Raman amplifier according to claim 25, wherein said dispersion compensation section is arranged between said forward stage Raman amplification optical fiber and said backward stage Raman amplification optical fiber.

27. A Raman amplifier according to claim 18, wherein said Raman amplification optical fiber has a chromatic dispersion whose absolute value is 5 ps/nm/km or more in the signal light wavelength band.

28. A Raman amplifier according to claim 18, wherein said Raman amplification optical fiber has a zero dispersion wavelength of shorter than the shortest wavelength of the pumping light to be supplied.

29. A Raman amplifier according to claim 18, wherein said Raman amplification optical fiber has an effective of 30 $\mu m^2$ or less at the pumping light wavelength.

30. A Raman amplifier according to claim 18, wherein said Raman amplification optical fiber has a cut-off wavelength of shorter than the shortest wavelength of the pumping light to be supplied.

31. A Raman amplifier according to claim 18, wherein a signal polarization path from said input end to said output end has a propagation mode dispersion of 1 ps or less in the signal light wavelength band.

32. An optical communication system including a Raman amplifier according to claim 18.

33. An optical communication system, comprising:
an optical fiber transmission line where signal light propagates;
a Raman amplifier according to claim 18;
a third pumping light source for supplying the pumping light to said optical fiber transmission line; and
a third optical multiplexing structure for guiding the pumping light from said third pumping light source to said optical fiber transmission line.

34. An optical communication system, comprising:
an optical fiber transmission line where signal light propagates;
a Raman amplifier according to claim 18;
a bypass transmission line for guiding the pumping light which propagates through at least a part of a Raman amplification optical fiber included in said Raman amplifier to outside said Raman amplifier; and
a fourth optical multiplexing structure for guiding the pumping light which propagates through said bypass transmission line to said optical fiber transmission line.

35. An optical communication system according to claim 34, further comprising an optical demultiplexer for guiding light which propagates through said Raman amplification optical fiber to said bypass transmission line, and an optical filter for transmitting the pumping light out of the lights demultiplexed by said optical demultiplexer.

36. A Raman amplifier provided at a predetermined position on an optical fiber transmission line and has an input end for entering signal light which propagates through said optical fiber transmission line and an output end for outputting said Raman-amplified signal light, comprising:
an optical amplification section which is installed between said input end and said output end, and includes a Raman amplification optical fiber for Raman-amplifying signal light which enters through said input end by the supply of pumping light into said Raman amplification optical fiber;
a dispersion compensation section provided between said input end and said output end while being optically connected to said Raman amplification optical fiber, and compensates for a total chromatic dispersion in the signal light wavelength of said optical fiber transmission line positioned outside of said Raman amplifier and said Raman amplification optical fiber positioned inside of said Raman amplifier; and
a pumping light source supply system, comprising a first pumping light source, and supplies said pumping light to said Raman amplification optical fiber, and a first optical multiplexing structure for guiding the pumping light from said first pumping light source to said Raman amplification optical fiber without passing through said dispersion compensating optical fiber, wherein said Raman amplification optical fiber has an effective area of 30 µm² or less at the pumping light wavelength, and wherein a signal propagation path from said input end to said output end, excluding said dispersion compensation section, has a total chromatic dispersion whose absolute value is 5 ps/nm or less in the signal light wavelength band.

37. A Raman amplifier according to claim 36, wherein said pumping light supply system includes a second pumping light source for supplying pumping light with a sufficient power to cause induced Raman scattering to said dispersion compensating optical fiber, and a second optical multiplexing structure for guiding the pumping light from said second pumping light source to said dispersion compensating optical fiber without passing through said Raman amplification optical fiber.

38. A Raman amplifier according to claim 36, wherein the pumping light to be supplied to said dispersion compensating optical filter has a sufficient power to obtain a Raman gain equal to or more than the transmission loss in said dispersion compensating optical fiber.

39. A Raman amplifier according to claim 36, wherein said dispersion compensating optical fiber is arranged at a position where the pumping light propagating through at least a part of said Raman amplification optical fiber reaches.

40. A Raman amplifier according to claim 39, wherein said dispersion compensating optical fiber is supplied with pumping light having a sufficient power to obtain a Raman gain equal to or more than transmission loss in said dispersion compensating optical fiber.

41. A Raman amplifier according to claim 36, wherein said Raman amplification optical fiber includes a forward stage Raman amplification optical fiber provided at the upstream side and a backward stage Raman amplification optical fiber provided at the downstream side, in view from the propagation direction of said signal light.

42. A Raman amplifier according to claim 41, wherein said dispersion compensating section is arranged between said forward stage Raman amplification optical fiber and said backward stage Raman amplification optical fiber.

43. A Raman amplifier according to claim 36, wherein said Raman amplification optical fiber has a chromatic dispersion whose absolute value is 5 ps/nm/km or more in the signal light wavelength band.

44. A Raman amplifier according to claim 36, wherein said Raman amplification optical fiber has a zero dispersion wavelength of shorter than the shortest wavelength of the pumping light to be supplied.

45. A Raman amplifier according to claim 36, wherein said Raman amplification optical fiber has a cut-off wavelength of shorter than the shortest wavelength of the pumping light to be supplied.

46. A Raman amplifier according to claim 36, wherein a signal polarization path from said input end to said output end has a propagation mode dispersion of 1 ps or less in the signal light wavelength band.

47. An optical communication system including a Raman amplifier according to claim 36.

48. An optical communication system, comprising:
an optical fiber transmission line where signal light propagates;
a Raman amplifier according to claim 36;

a third pumping light source for supplying the pumping light to said optical fiber transmission line; and a third optical multiplexing structure for guiding the pumping light from said third pumping light source to said optical fiber transmission line.

49. An optical communication system, comprising:
an optical fiber transmission line where signal light propagates;
a Raman amplifier according to claim 36;
a bypass transmission line for guiding said pumping light which propagates through at least a part of a Raman amplification optical fiber included in said Raman amplifier to outside said Raman amplifier; and
a fourth optical multiplexing structure for guiding the pumping light which propagates through said bypass transmission line to said optical fiber transmission line.

50. A Raman amplifier according to claim 49, further comprising an optical demultiplexer for guiding light which propagates through said Raman amplification optical fiber to said bypass transmission line, and an optical filter for transmitting said pumping light out of the lights demultiplexed by said optical demultiplexer.

51. A Raman amplifier provided at a predetermined position of an optical fiber transmission line and having an input end for entering signal light which propagates through said optical fiber transmission line and an output end for outputting said Raman-amplified signal light, comprising:

an optical amplification section provided between said input end and said output end, and including a Raman amplification optical fiber for Raman-amplifying signal light which enters through said input end by supplying pumping light into said Raman amplification optical fiber;

wherein said Raman amplifier further comprises a dispersion compensation section provided between said input end and said output end while being optically connected to said Raman amplification optical fiber, said dispersion compensation section compensating for a total chromatic dispersion of said optical fiber transmission line positioned outside of said Raman amplifier and said Raman amplification optical fiber positioned inside of said Raman amplifier, in a signal light wavelength band, and wherein said Raman amplification optical fiber has an effective area of 30 µm² or less in the pumping light wavelength, and a chromatic dispersion whose absolute value is 5 ps/nm/km or more in the signal light wavelength band.

52. A Raman amplifier provided at a predetermined position on an optical fiber transmission line and has an input end for entering signal light which propagates through said optical fiber transmission line and an output end for outputting said Raman-amplified signal light, comprising:

an optical amplification section which is installed between said input end and said output end, and includes a Raman amplification optical fiber for Raman-amplifying signal light which enters through said input end by the supply of pumping light into said Raman amplification optical fiber;

a dispersion compensation section provided between said input end and said output end while being optically connected to said Raman amplification optical fiber, and compensates for a total chromatic dispersion in the signal light wavelength of said optical fiber transmission line positioned outside of said Raman amplifier and said Raman amplification optical fiber positioned inside of said Raman amplifier; and a pumping light source supply system, comprising a first pumping light source, and supplies said pumping light to said Raman amplification optical fiber, and a first optical multiplexing structure for guiding the pumping light from said first pumping light source to said Raman amplification optical fiber without passing through said dispersion compensating optical fiber, and wherein said Raman amplification optical fiber has an effective area of 30 μm² or less in the pumping light wavelength, and a chromatic dispersion whose absolute value is 5 ps/nm/km or more in the signal light wavelength band.

53. An optical communication system including a Raman amplifier according to claim 51.

54. An optical communication system including a Raman amplifier according to claim 52.

* * * * *